United States Patent [19]

Ezzell et al.

[11] Patent Number: 4,470,889
[45] Date of Patent: Sep. 11, 1984

[54] ELECTROLYTIC CELL HAVING AN IMPROVED ION EXCHANGE MEMBRANE AND PROCESS FOR OPERATING

[75] Inventors: Bobby R. Ezzell, Lake Jackson; William P. Carl, Angleton; William A. Mod, Lake Jackson, all of Tex.

[73] Assignee: The Dow Chemical Company, Midland, Mich.

[21] Appl. No.: 158,429

[22] Filed: Jun. 11, 1980

[51] Int. Cl.$^3$ .................. C25B 1/34; C25B 13/08; C25B 13/46
[52] U.S. Cl. .................................. 204/98; 204/128; 204/252; 204/296
[58] Field of Search .......... 204/296, 98, 128, 252–258

[56] References Cited

U.S. PATENT DOCUMENTS

| | | | |
|---|---|---|---|
| 2,393,967 | 5/1946 | Brubaker | 260/80 |
| 2,554,752 | 7/1951 | Berry | 260/29.6 |
| 2,593,583 | 4/1952 | Lontz | 260/92.1 |
| 3,041,317 | 6/1962 | Gibbs et al. | 260/79.3 |
| 3,114,778 | 12/1963 | Fritz et al. | 260/614 |
| 3,214,478 | 10/1965 | Milian | 260/615 |
| 3,242,218 | 3/1966 | Miller | 260/615 |
| 3,250,806 | 5/1966 | Warnell | 260/535 |
| 3,282,875 | 11/1966 | Connolly et al. | 260/29.6 |
| 3,301,893 | 1/1967 | Putnam et al. | 260/513 |
| 3,450,684 | 6/1969 | Darby | 260/87.5 |
| 3,536,733 | 10/1970 | Carlson | 260/348.5 |
| 3,560,568 | 2/1971 | Rentzh | 260/513 |
| 3,784,399 | 1/1974 | Grot | 260/96 R |
| 3,909,378 | 9/1975 | Walmsley | 204/98 |
| 3,969,285 | 7/1976 | Grot | 204/262 |
| 4,025,405 | 5/1977 | Dotson et al. | 204/98 |
| 4,035,254 | 7/1977 | Gritzner | 204/98 |
| 4,035,255 | 7/1977 | Gritzner | 204/98 |
| 4,062,753 | 12/1977 | Falvo | 204/98 |
| 4,065,366 | 12/1977 | Oda et al. | 204/98 |
| 4,085,071 | 4/1978 | Resnick et al. | 204/98 |
| 4,126,588 | 11/1978 | Ukihashi et al. | 260/2.2 R |
| 4,138,426 | 2/1979 | England | 260/465.6 |
| 4,151,053 | 4/1979 | Seko et al. | 204/98 |
| 4,192,725 | 3/1980 | Dotson et al. | 204/98 |
| 4,197,179 | 4/1980 | Ezzell | 204/98 |

FOREIGN PATENT DOCUMENTS

| | | | |
|---|---|---|---|
| 118597 | 10/1977 | Japan | 204/296 |
| 1401290 | 7/1975 | United Kingdom | 204/296 |
| 1406673 | 9/1975 | United Kingdom | 204/296 |
| 1497749 | 1/1978 | United Kingdom | 204/98 |
| 1497748 | 1/1978 | United Kingdom | 204/296 |
| 1518387 | 7/1978 | United Kingdom | 204/296 |
| 1565876 | 4/1980 | United Kingdom | 204/296 |

OTHER PUBLICATIONS

"Nafion"–An Electrochemical Traffic Controller", by D. J. Vaughan.
"Nafion Membranes–Factors Controlling Performance in the Electrolysis of Salt Solutions", G. E. Munn, Dupont Experimental Station, E.C.S., 10/1977.
"Ion Exchange Membrane for Chlor–Alkali Process", Ukihashi et al., Abstract 247, A.C.S. Meeting, Philadel., 4-1977.
"Nafion Membranes Structured for High Efficiency Chlor–Alkali Cells", by C. J. Hora, presented at Electro Chem. Soc., 10–1977, Atlanta, Ga.
"Perfluorinated Ion Exchange Membranes", by W. G. F. Grot et al., presented at Nat'l Meeting Electro–Chem. Soc., Houston, Texas, May 7-11, 1972.
"The Asahi Chemical Membrane Chlor-Alkali Process", presented to the Cl2 Institute, 20th Cl2 Plant Mgrs. Seminar, New Orleans, La., 2-9-77.

(List continued on next page.)

Primary Examiner—R. L. Andrews

[57] ABSTRACT

An electrolytic cell and a process for electrolysis using the cell are provided. The electrolytic cell is separated into an anode chamber and a cathode chamber by a fluorinated polymer membrane; wherein the membrane comprises:

(a) at least 60 mole percent [CFX—CF$_2$] where X=F or Cl;
(b) an ion exchange equivalent weight of at least 600;
(c) pendant sulfonyl ion exchange groups; and
(d) pendant substantially fluorinated carbon groups which have no ion exchange functionality.

These cells are particularly useful for the electrolysis of aqueous, alkali metal halides.

35 Claims, 1 Drawing Figure

"Commercial Operation of the Ion Exchange Membrane Chlor-Alkali Process", presented to The Amer. Chem. Soc. Centennial Meeting, New York, Apr. 4-9, 1976.

"Polymers & Telomera of Perfluoro-1,4-pentadiene", J. E. Fearn et al., J. of Polymer Science, Part A-1, vol. 4, 131-140, (1966).

"Aliphatic F Compounds", Lovelace et al., Reinhold, NY, 1958; p. 107.

"F in Organic Chem.", R. D. Chambers, pp. 211-212.

"Formation of Adducts between Fluorinated Keytones and Metal Fluorides", F. W. Evans, J. of Organic Chem., vol. 33, #5, May 1968.

"Chem. of Organic F. Compds.", 2nd Ed., John Wiley & Sons, N.Y., M. Hudlicky, pp. 20-21.

"New Synthetic Reagents & Reactions", G. A. Olah, Aldrichimica Acta, vol. 12, #3, 1979.

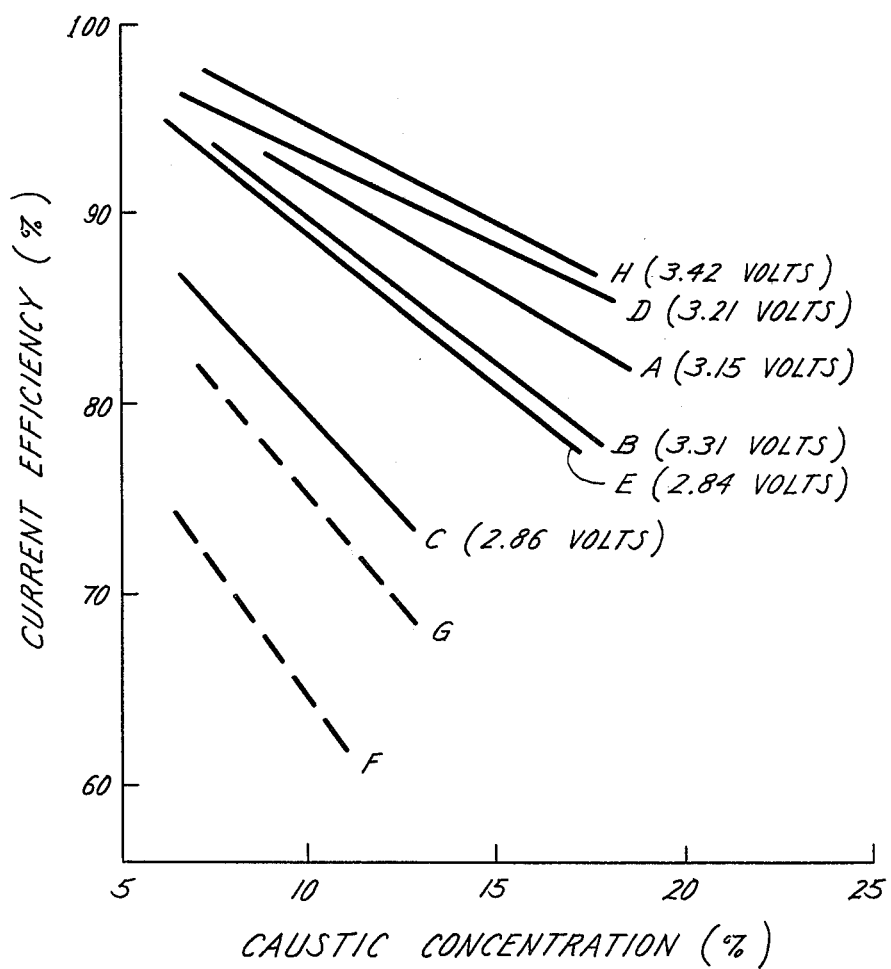

ELECTROLYTIC CELL HAVING AN IMPROVED ION EXCHANGE MEMBRANE AND PROCESS FOR OPERATING

BACKGROUND OF THE INVENTION

The electrolytic production of chlorine and caustic by the electrolysis of brine has been well known for many years. Historically, diaphragm cells using a hydraulically-permeable asbestos diaphragm, vacuum-deposited onto foraminous steel cathodes, have been widely commercialized. Such diaphragm cells, employing permeable diaphragms, produce NaCl-containing NaOH catholytes because NaCl passes through the diaphragm from the anolyte to the catholyte. Such NaCl-containing caustic generally requires a de-salting process to obtain a low-salt caustic for industrial purposes.

In recent years, the chlor-alkali industry has focused much of its attention on developing membrane cells to produce low-salt of salt-free caustic in order to improve quality and avoid the costly desalting processes. Membranes have been developed for that purpose which are substantially hydraulically-impermeable, but which will permit hydrated $Na^+$ ions to be transported from the anolyte portion to the catholyte portions, while substantially preventing transport of $Cl^-$ ions. Such cells are operated by flowing a brine solution into the anolyte portion and by providing salt-free water to the catholyte portion to serve as the caustic medium. The anodic reactions and cathodic reactions are the same regardless of whether a membrane cell or a diaphragm cell is employed.

Since the disclosure of fluorocarbon polymers containing sulfonic acid functional groups on pendant fluorocarbon chains was first disclosed by Connolly (U.S. Pat. No. 3,282,875), a great deal of work has been done on using these and similar materials as ion exchange membranes in chloralkali cells. it has been stated that because of excessive hydration, sulfonic acid membranes are not useful, particularly at cell conditions where the caustic strength in the operating cell exceeds 18% (Maomi Seko, Commercial Operation of the Ion Exchange Membrane Chlor-Alkali Process, The American Chemical Society Meeting, April, 1976, New York, N.Y.). Because of the problems encountered with sulfonic acid substituted membranes, considerable work has been directed at finding a suitable substitute for the sulfonic acid. Carboxylic acid functional membranes have been reported to operate at considerably higher caustic strengths than sulfonic acid membranes (M. Seko above ref., U.S. Pat. No. 4,065,366, Brit. Pat. Nos. 1,497,748; 1,497,749; 1,518,387). Membranes with at least part of the sulfonic acid groups converted to sulfonamide have also been reported to operate at higher caustic strengths than membranes with only sulfonic acid functional groups (U.S. Pat. Nos. 3,784,399; 3,969,285). The incentive for striving for high caustic strength in the cell lies in the fact that most commercial caustic is sold as a 50% solution. Thus, higher strengths achieved in the cell results in less water that must be evaporated to reach the commercial 50% level. This results in savings of "evaporation energy", the energy required to evaporate the solution.

In addition to the caustic strength being important, two other criteria of the operating cell must also be considered for a complete energy view of the overall process. One is current efficiency, which is the ability of the membrane to prevent migration of the caustic produced at the cathode into the anode compartment and the second is the voltage at which the cell operates, which is partly determined by the electrical resistance of the membrane. Power efficiency is often used as one term that considers both the current efficiency and cell voltage. It is defined as the product of the theoretical voltage divided by the actual voltage multiplied by the actual caustic produced divided by the theoretical caustic that could have been produced at a given current. Thus, it is apparent that power efficiency is reduced by higher cell voltage or lower current efficiency. The membrane has a direct effect on both. The most common method of comparing cells is to express the operation as kilowatt hours (KWH) of power consumed per metric ton (mt) of product produced. This expression also considers both voltage, higher voltage increasing the quantity KWH, and current efficiency, lower efficiency decreasing the quantity of product produced (mt). Thus, the lower the value KWH/mt, the better the performance of the cell.

In general, the changes that have been made in membranes to increase the caustic strength in the cell have resulted in at least partially offsetting increases in the quantity KWH/mt. It has been reported that even though a carboxylic acid membrane was capable of producing greater than 30% caustic at above 90% current efficiency, the most economical operation was at 21–25% caustic because of lower cell voltage (M. Seko, "The Asahi Chemical Membrane Chlor-Alkali Process", The Chlorine Institute, Inc. 20th Chlorine Plant Managers Seminar, New Orleans, February, 1977). In addition to problems of increasing cell voltage caused by membranes capable of higher caustic strength operation, these types of membranes, when compared to sulfonic acids, do not last as long in service. This is at least in part caused by greater sensitivity than the sulfonic acids to impurities found in brine feed. It has been reported that the useful operating life of sulfonamide membranes is only about one year (D. R. Pulver, presented at the Chlorine Institute's 21st Plant Managers Seminar, Houston, Tex., Feb., 1978). Sulfonic acid membranes have operated up to three years in chlor-alkali cells. A great deal of expense is incurred by shortened membrane life because of having to replace the expensive membrane materials. Also the loss of production and labor in having to remove cells from service, disassemble, assemble and put them back in service in costly.

The polymers used in the prior art as membranes are generally copolymers formed by copolymerizing a monomer chosen from the group of fluorinated vinyl compounds composed of vinyl fluoride, hexafluoropropylene, vinylidene fluoride, trifuloroethylene, chlorotrifluoroethylene, perfluoroalkyl vinyl ether and tetrafluoroethylene with an ion exchange functional (or group easily converted to ion exchange functional) vinyl ether monomer. The functional monomers for the sulfonic acids of the prior art are represented by U.S. Pat. No. 3,282,875)

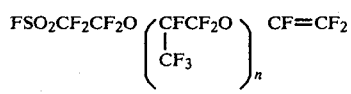

where n = 1–3

The sulfonamide of the prior art are represented by the general structure

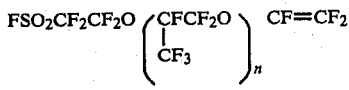

where the $FSO_2$-group is converted to $RNHSO_2$-by reaction with an amine compound and n=0-2 (Brit. No. 1,406,673 and U.S. Pat. No. 3,784,399). The carboxylic acid monomers are represented by similar structures where the sulfonyl group has been replaced with either a carboxylic acid or a group such as

or $-C\equiv N$ that is easily converted to a carboxylic acid (U.S. Pat. No. 4,065,366, Brit. Nos. 1,497,748; 1,497,749; 1,518,387). In one case (U.S. Pat. No. 4,126,588), the membrane is composed of a terpolymer made by selecting one monomer from the group of perfluorovinyl compounds listed above and the other two from different carboxylic acid functional monomers. One is chosen from a group represented by $CF_2=CFOCF_2(CFX-OCF_2)(CFX')_B-(CF_2OCFX'')_Y-A$ where A represents a carboxylic acid or derivative and the other from a group represented by $CF_2=CF(O)-(CFY)_Y-A'$ where A' is defined as A above. Two different functional monomers were used in the above case to achieve desirable physical properties of the polymers.

In addition to work described above where changes in functional groups have been used as a means of achieving higher caustic strength in operating cells, methods of operating the cells themselves that lead to increased caustic strength have been described. Series catholyte flow (U.S. Pat. No. 1,284,618) and countercurrent series anolyte and catholyte flow (U.S. Pat. No. 4,197,179) lead to increased caustic strength without sacrificing either current efficiency or cell voltage. These techniques are also useful because caustic strengths approaching those obtained with carboxylic acid and sulfonamide membranes can be attained using sulfonic acid membranes with their inherently longer service life.

U.S. Pat. Nos. 4,025,405 and 4,192,725 show electrolytic cells having a stable, hydrated, selectively permeable, electrically conductive membrane. The membrane is a film of fluorinated copolymer having pendant sulfonic acid groups containing recurring structural units of the formula:

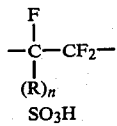

and $CXX'-CF_2$  (2)

where R is R'

in which R' is F or perfluoroalkyl of 1 to 10 carbon atoms; Y is F or $CF_3$; m is 1, 2, or 3; n is 0 or 1; X is F, Cl, H, $CF_3$; X' and X are $CF_3-(CF_2)_z$ wherein Z is 0-5; the units of formula (1) being present in an amount of from 3-20 mole percent.

SUMMARY OF THE INVENTION

An electrolytic cell and a process to use the cell are provided. The electrolytic cell is separated into an anode compartment and a cathode compartment by a fluorinated polymer membrane; wherein the membrane has:
(a) at least 60 mole percent $[CFX-CF_2]$, where $X=F$ or Cl;
(b) an ion exchange equivalent weight of at least 600;
(c) pendant sulfonyl ion exchange groups; and
(d) pendant substantially fluorinated carbon groups which have no ion exchange functionality.

DETAILED DESCRIPTION OF THE INVENTION

It has been discovered that certain sulfonic acid membranes perform in electrolytic chlor-alkali cells better than those of the prior art. It has been found that non ion exchange pendant groups attached to the polymer backbone cause surprising and unexpected reductions in the electrical resistance of the membrane. It is known to those skilled in the art of polymer science that pendant groups, whether chemically inert or active, act as internal plasticizers and render polymers more pliable and easier to fabricate than similar polymers not having the pendant groups. In many cases this technique is used to reduce the crystallinity of polymer structures. It is not expected from anything known in the prior art that introduction of inert pendant groups to polymers used as membranes in electrolytic cells would beneficially affect the performance of the cell. The reasons for this surprising benefit from introduction of the inert pendant group is not at all clear. Any reasons given, at the present state of the art concerning theory of membrane performance, would be more speculation. At the present time, a generally accepted theory of membrane operation is non existent even for copolymers. One theory involving ionic clustering that appears to explain some of the performance of one copolymer has been disclosed (T. D. Gierke, 152nd national Meeting the Electrochemical Society, Atlanta, Ga., October, 1977).

Several criteria, aside from the criteria of cell performance, are necessary for use of polymers as membranes in electrolytic cells. When the polymers are used as films, which are conveniently made by melt extrusion of the like, on commercial scale, the physical and chemical properties of the film unit must withstand the environment of the cell. This severely restricts the materials useful in the harsh environment of a chlor-alkali cell. The cell is divided by the membrane into two compartments, an anolyte compartment wherein chlorine gas is made and constantly evolved from an anode and a catholyte compartment wherein caustic is produced at a cathode. These cells normally operate at temperatures of from about 70° C. up to temperatures of about 100° C. and are expected to continuously operate at these conditions for many months and even years. This chemical environment of strong, hot caustic on one side and a highly oxidative environment on the other virtually eliminates the use of most organic polymers or membranes. The constant churning of gas being evolved through the liquid electrolyte solutions in the cell severely limits the physical properties that a film must have in order to meet the lieftime requirements of the cell. It is known to physically support polymer films on such materials as polytetrafluoroethylene scrim to aid in meeting the life requirements, but even then, the film must be physically sound to a large degree. Any holes or tears that develop in the film lead to contamination of the caustic product in the catholyte with salt from the anolyte and even worse, can lead to explosive mixtures of hydrogen in chlorine when cathodes are used that produce hydrogen along with attendant production of chlorine on the anode.

It is known in the art that fluoropolymers, in general, meet the chemical requirements of the chlor-alkali cell. These fluoropolymers can be substituted with other halogen atoms such as chlorine or bromine that are not reactive in the cell environment, but, although contrary to some teachings, these polymers should not contain hydrogen atoms on carbons that make up the main polymer backbone. Carbon-hydrogen bonds are chemically attacked by both oxidation from the anolyte components and caustic in the catholyte. Chemical attack on the polymer backbone can lead to reduced molecular weight by carbon-carbon bond cleavage and thus to severe damage to film physical properties.

Physical properties of a polymer are dependent on polymer structure. A highly crystalline fluoropolymer made from simple, unsubstituted monomers such as tetrafluoroethylene is tough, but has extremely high melting or softening temperatures. Fabrication is difficult or near impossible by simple techniques such as melt extrusion. Homopolymers of long chain, terminal fluorocarbon olefins which result in polymers having many pendant groups are difficult to prepare because of having a relatively unreactive olefin site and when formed are often low molecular weight, waxy, amorphous solids having little, if any, plastic quality. Materials of this nature are useless as films. Copolymers of the two type monomers described above often have properties, better than the homopolymers. Copolymers of tetrafluoroethylene and perfluoroalkyl vinyl ethers (U.S. Pat. No. 3,896,179) and halofluoroalkyl vinyl ethers have excellent physical properties and can be conveniently melt fabricated into films. Thus, polymers with a limited number of pendant groups can maintain most of the favorable physical characteristics of the parent (no long pendant groups) polymer and also lend itself to simple fabrication.

Membranes of the present invention are conveniently made from polymers prepared by copolymerizing at least three monomers where one is a simple fluorocarbon olefin such as tetrafluoroethylene or chlorotrifluoroethylene, another is a monomer having potential sulfonate ion exchange functionality such as

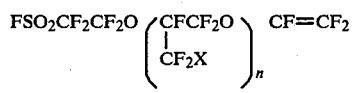

where X=Cl, Br or F and n=0-3 (U.S. Pat. No. 3,282,875) and still another is a monomer having a halofluoro or perfluoro chain having no ion exchange functionality, attached to the olefin function. When polymers are selected from the above class of polymers that contain a sufficient (greater than 60 mole percent) amount of the simple, non pendant group originating, monomer such as tetrafluoroethylene, tough, easily fabricated films result that give outstanding performance when used as membranes in chlor-alkali cells.

These films may or may not be supported by materials such as polytetrafluoroethylene scrim.

The concentration of the sulfonate ion exchange functional group in the polymers is also critical to the performance of the materials as membranes in electrolytic cells. Concentration of the functional group in the dry polymer is expressed herein and in most of the prior art as equivalent weight, which is defined as the formula weight of the polymer containing one equivalent of the functional group. It can be defined and conveniently determined, by standard acid-base titration, as the weight of the polymer, having the functional group, the sulfonic acid group in the present invention, in the acid form, required to neutralize one equivalent of base. The prior art teaches and demonstrates that sulfonic acid membranes of the prior art should have equivalent weights of at least about 1100 to be useful in chlor-alkali cells. Sulfonic acid membranes having lower equivalent weight allow excessive migration of hydroxide ions from the catholyte to the anolyte portion of the cell and thus result in excessively low current efficiency. It has been found that equivalent weights of at least part of the membranes of the current invention can be substantially less than 1100 and still be useful in chlor-alkali cells. This is particularly true when the pendant group having the ion exchange functional group is short. In fact, particularly preferred polymers of the present invention are made using the ion exchange functional monomer

as opposed to the functional monomer

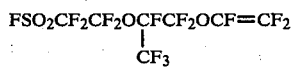

of the prior art. One terpolymer having an equivalent weight of 900 is shown in the examples to perform substantially better than an 1100 equivalent weight copolymer of the prior art. It is thought that equivalent weights as low as 600, when the pendant group having the sulfonic acid functionality is short, should be operable in chlor-alkali cells.

The beneficial effects of the terpolymers, having the non ion exchange pendant groups, are apparent when cells, in the examples, containing these materials as membranes are compared to cells containing the copolymers of the prior art as membranes and to cells containing copolymers of tetrafluoroethylene and the short functional monomer shown above as membranes.

The pendant fluorinated carbon groups having no ion exchange functionality are represented by the general formula

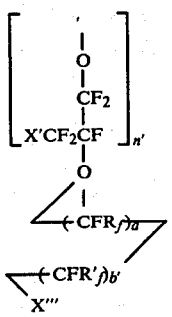

where
- X′ and X‴ are independently selected from the group consisting of F, Cl and Br
- n′, a′ and b′ are independently zero or an integer greater than zero
- $R_f$ and $R'_f$ are independently selected from the group consisting of fluorine, chlorine, fluoroalkyls and chlorofluoro alkyls.

Preferably a′=0–3; b′=0–3; Rf=Cl or F and R′=Cl or F.

Preferably n′=0–3. Most preferably n′=0 or 1 and X′=Cl when n′=1. Preferably X‴ is Cl.

BRIEF DESCRIPTION OF THE DRAWING

The FIGURE shows the results of using various ion exchange membranes in an electrolytic cell for the electrolysis of a NaCl brine solution. For each membrane tested, the figure shows its operational voltage, its current efficiency and the concentration of the caustic produced in the cell.

EXAMPLE 1

A series of ion exchange membranes were individually tested in a small electrolytic cell. The cell had an anode and a cathode with the ion exchange membrane being evaluated sandwiched therebetween, thus separating the cell into an anode chamber and a cathode chamber. Each electrode had a square shape and had an area of 8.63 square inches. Each electrode had a solid, metal stud welded to it. Each stud passed through a wall of the cell and was provided with leak proof seals. Both studs were connected to a power supply. The stud connected to the anode was constructed of titanium, while the stud connected to the cathode was constructed of steel. The anode, itself, was an expanded titanium mesh screen coated with a $RuO_2$—$TiO_2$ mixture, while the cathode was constructed from woven steel wires.

The anode chamber was filled with a saturated NaCl brine solution (approximately 25 weight percent NaCl) and catholyte chamber was filled with a caustic solution having approximately 12 weight percent NaOH concentration. The cell was energized by applying a constant current of approximately 8.63 amps, to give a current density of 1.0 amps per square inch of electrode area. A saturated brine solution (approximately 25 weight percent NaCl) was flowed into the anode chamber at a rate sufficient to maintain the concentration of the anolyte leaving the cell at approximately 17–20 weight percent NaCl. Deionized water was flowed into the catholyte chamber, in a similar manner, at a rate sufficient to maintain the catholyte leaving the cell at a desired NaOH concentration. During the evaluation of each membrane, the NaOH concentration was varied in order to determine the cell operation over a range of caustic concentrations.

The temperature of the cell was controlled throughout each evaluation at about 80° C. by means of an immersion heater connected to a thermocouple inserted into the anolyte chamber. During the evaluation of each membrane the cell voltage was constantly monitored by measuring the difference in voltage potential between the anode stud and the cathode stud. For each evaluation, the cell was operated for several days to reach equilibrium. Then current efficiency was determined by collecting the catholyte leaving the cell for a given period of time, usually 16 hours, and determining the amount of NaOH actually produced, as compared to the amount theoretically produced at the applied current.

Before the evaluation of each membrane, the following preparatory procedures were followed:
(1) the acid form of each membrane was dried in an oven and then equilibrated at ambient conditions;
(2) the membrane was soaked in a 30 weight % solution of triethanolamine in water for 30 minutes at 25° C.;
(3) the membrane was removed from the solution and air dried; and
(4) the membrane was installed in the above-described electrolytic cell.

In the above manner, the following membranes were evaluated in actual cell operation.

A.* Hydrolyzed 1500 eq. wt., 2 mil (0.002 inches) thick copolymer of tetrafluoroethylene (TFE) and

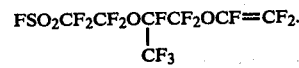

* This member was received from E. I. DuPont in the acid form and was treated in the TEA solution as received.

B. Hydrolyzed 1375 eq. wt., 7 mil thick copolymer of TFE and $FSO_2CF_2CF_2OCF=CF_2$.

C. Hydrolyzed 860 eq. wt., 7.5 mil thick copolymer of TFE and $FSO_2CF_2CF_2OCF=CF_2$.

D. Hydrolyzed 1240 eq. wt., 8 mil thick terpolymer of TFE and a mixture of $FSO_2CF_2CF_2OCF=CF_2$ and $ClCF_2CF_2CF_2OCF=CF_2$ in a ratio of 8:1.

E. hydrolyzed 900 eq. wt., 8 mil thick terpolymer of TFE and a mixture of $FSO_2CF_2CF_2OCF=CF_2$ and $ClCF_2CF_2CF_2OCF=CF_2$ in a ratio of 8:1.

F&G. Literature performance for hydrolyzed 1100 and 1200 eq. wt. copolymers of TFE and

M Seko, "Commercial Operation of The Ion Exchange Membrane Chlor-Alkali Process", The American Chemical Society, Centennial Meeting, New York, April, 1976.

H. Hydrolyzed 1350 eq. wt., 9.5 ml thick terpolymer of TFE and a mixture of $FSO_2CF_2CF_2OCF=CF_2$ and

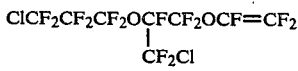

in a ratio of 8:1.

DISCUSSION OF RESULTS

The FIGURE shows the results obtained from the evaluation of various membranes in the above described cell, except for membranes designated as F and G. The data shown for these latter two membranes was obtained from published literature and is inserted for comparative purposes.

The figure shows the relationship of the current efficiency of the cell to the caustic concentration of the catholyte as it leaves the cell. The numbers in parenthesis beside each curve represent average cell operating voltages over the range of caustic concentrations under which each membrane was tested.

All membranes showed that current efficiency is indirectly proportional to the caustic concentration of the catholyte. As has been discussed earlier, it is beneficial to maximize the current efficiency and minimize the voltage.

Certain comparisons have been made between the performance of the various membranes.

Comparison of membranes designated as B, C, D, H and E show the beneficial effects caused by incorporation of pendant, substantially fluorinated carbon groups having no ion exchange functionality into copolymers of TFE and the same functional monomer, $FSO_2CF_2CF_2OCF=CF_2$.

Membranes designated as B and C are copolymers differing only in the relative amounts of TFE and the functional monomer. Thus, membrane C has more ion exchange functionality than membrane B, which is reflected in their 860 and 1375 eq. wts. respectively.

Membranes designated as D, E and H are all membranes which have pendant sulfonyl ion exchange groups and have pendant, substantially fluorinated carbon groups which have no ion exchange functionality. As shown by their respective equivalent weights of 1240, 900 and 1350, they have differing amounts of ion exchange functionality.

A direct comparison of cells having membrane B with cells having membrane E shows that where the two types of membranes operate at essentially equal current efficiencies, the cell containing the membrane having pendant, substantially fluorinated carbon groups which have no ion exchange functionality, as well as containing pendant sulfonyl ion exchange groups, operates at substantially (14%) lower voltage than the cell having a membrane which does not have a pendant, substantially fluorinated carbon group which has no ion exchange functionality, but has only the sulfonyl containing pendant group.

A comparison of the cell containing membrane C with a cell containing membrane E demonstrates that while the cells operate at approximately the same voltage, the cell having a membrane which has pendant substantially fluorinated carbon groups not having ion exchange functionality, as well as containing pendant sulfonyl containing groups, operates at a substantially higher current efficiency than the cell containing the membrane which has only pendant sulfonyl containing groups.

Comparison of cells which have membrane B to cells having membranes D or H, shows that cells operate at a substantially higher current efficiency if the membrane contains pendant, substantially fluorinated carbon groups and pendant, sulfonyl groups (membranes D and H) as compared to cells which have membranes containing pendant sulfonyl containing groups only.

Comparisons of the cell containing membrane D with the cell containing membrane A, demonstrates the clear superiority of the membrane which has both types of pendant groups as compared to the membrane of the prior art which has only pendant groups which contain sulfonyl groups. Even though membrane D is four (4) times as thick as membrane A, the cell voltages in both cells are approximately the same. It has been calculated that if membrane A were as thick as membrane D, the cell containing membrane A would operate at well above four (4) volts. As shown in the figure, the cell containing the membrane of the prior art (A) does not operate as efficiently as membranes of the present invention, such as membrane D. The cell containing membrane D operates at a higher current efficiency than the cell having membrane A, while at the same time having less electrical resistance per unit of thickness.

The table shows a comparison of polymers A, B, C, D, E and H where power consumption per metric ton of caustic has been calculated with all cells operating at 12% caustic. The table clearly demonstrates the superiority of the cells which have membranes (D, E and H) having two pendant groups; one pendant group having sulfonyl ion exchange groups and one pendant, substantially fluorinated carbon group which has no ion exchange groups, as compared to cells which have membranes (B and C) having only one pendant group, a sulfonyl containing group. This comparison between the cells containing membranes D, E and H as opposed to cells containing membranes B and C is made where the membrane thicknesses are similar. Additionally, the table shows that even when the thickness of membrane A (the prior art membrane having only sulfonyl containing pendant groups) is only one-fourth (¼) that of membranes D, E and H (which have two types of pendant groups) the latter perform equally (D) or better (E).

TABLE I

| CELL | TYPE POLYMER | POWER CONSUMPTION (DCKWH/mt NaOH) |
|---|---|---|
| A* | Copolymer | 2358 |
| B | Copolymer | 2549 |
| C | Copolymer | 2554 |
| D | Terpolymer | 2213 |
| E | Terpolymer | 2358 |
| H | Terpolymer | 2477 |

*A conservative estimate of 4.0 volts for an 8 mil sample of A would give a value of 2994 DCKWH/mt NaOH.

We claim:

1. In an electrolytic cell of the type having an anode in an anode chamber; a cathode in a cathode chamber and an ion exchange membrane separating the anode chamber from the cathode chamber, wherein said membrane is a copolymer of $CFXCF_2$, where X is F or Cl, and a fluorinated vinyl ether compound having sulfonyl ion exchange functionality, wherein said copolymer has a polymeric backbone with sulfonyl-containing pendant groups attached thereto;

wherein the improvement comprises the copolymer having additional pendant groups attached to the backbone represented by the formula:

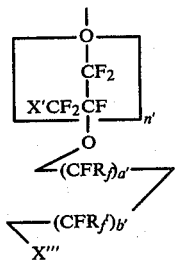

where
X' and X''' are independently selected from the group consisting of F, Cl and Br
n', a' and b' are independently zero or an integer greater than zero, provided $n'+a'+b'\neq 0$
$R_f$ and $R_f'$ are independently selected from the group consisting of fluorine, chlorine, fluoroalkyls and chlorofluoro alkyls.

2. The cell of claim 1 wherein the sulfonyl-containing pendant groups are represented by the general formula:

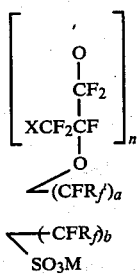

where
n=0 or an integer greater than zero;
X=F, Cl or Br;
M=hydrogen or an alkali metal;
$R_f$ and $R_f'$ are independently selected the group consisting of F, Cl, fluoroalkyl and chlorofluoroalkyl;
a=zero or an integer greater than zero;
b=zero or an integer greater than zero, provided $a+b\neq 0$.

3. The cell of claims 1 or 2 where a'=0-3; b'=0-3; $R_f$=Cl or F; and $R_f'$=Cl or F.

4. The cell of claims 1 or 2 where n=0-3 and X'=Cl or F when $n\neq 0$.

5. The cell of claims 1 or 2 where n'=0.

6. The cell of claims 1 or 2 where n=0 and X'''=F or Cl.

7. The cell of claims 2 where n=0-3.

8. The cell of claims 2 where a=0-3; b=0-3; $R_f$=Cl or F and $R_f'$=Cl or F.

9. The cell of claim 2 wherein n=0; n'=0; and X'''=F or Cl.

10. The cell of claim 2 where n'=1 and n=0.

11. The cell of claim 2 where n'=0 and n=1.

12. The cell of claim 2 where X=Cl and X'=Cl.

13. An electrolytic method using the cell of claims 1, 2, 9, 10, 11 or 12 comprising:

(a) feeding an alkali metal halide solution into the anode chamber;
(b) impressing an electrical current to the anode and the cathode at a level sufficient to cause electrolysis; and
(c) removing the products of electrolysis from the cell.

14. An electrolytic method using the cell of claim 3 comprising:
(a) feeding an alkali metal halide solution into the anode chamber;
(b) impressing an electrical current to the anode and the cathode at a level sufficient to cause electrolysis; and
(c) removing the products of electrolysis from the cell.

15. An electrolytic method using the cell of claim 4 comprising:
(a) feeding an alkali metal halide solution into the anode chamber;
(b) impressing an electrical current to the anode and the cathode at a level sufficient to cause electrolysis; and
(c) removing the products of electrolysis from the cell.

16. An electrolytic method using the cell of claim 5 comprising:
(a) feeding an alkali metal halide solution into the anode chamber;
(b) impressing an electrical current to the anode and the cathode at a level sufficient to cause electrolysis; and
(c) removing the products of electrolysis from the cell.

17. An electrolytic method using the cell of claim 6 comprising:
(a) feeding an alkali metal halide solution into the anode chamber;
(b) impressing an electrical current to the anode and the cathode at a level sufficient to cause electrolysis; and
(c) removing the products of electrolysis from the cell.

18. An electrolytic method using the cell of claim 7 comprising:
(a) feeding an alkali metal halide solution into the anode chamber;
(b) impressing an electrical current to the anode and the cathode at a level sufficient to cause electrolysis; and
(c) removing the products of electrolysis from the cell.

19. An electrolytic method using the cell of claim 8 comprising:
(a) feeding an alkali metal halide solution into the anode chamber;
(b) impressing an electrical current to the anode and the cathode at a level sufficient to cause electrolysis; and
(c) removing the products of electrolysis from the cell.

20. An improved ion exchange membrane suitable for use in a chlor-alkali electrolytic cell; said membrane being a copolymer of $CFXCF_2$, where X is F or Cl, and a fluorinated vinyl ether compound having sulfonyl ion exchange functionality; wherein said copolymer has a polymeric backbone with sulfonyl-containing pendant groups attached thereto;

wherein the improvement comprises the copolymer having additional pendant groups attached to the backbone represented by the formula:

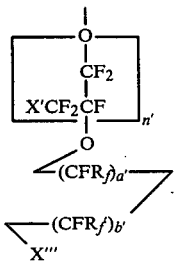

where

X' and X''' are independently selected from the group consisting of F, Cl and Br n', a' and b' are independently zero or an integer greater than zero, provided $n'+a'+b' \neq 0$ $R_f$ and $R_f'$ are independently selected from the group consisting of fluorine, chlorine, fluoroalkyls and chlorofluoro alkyls.

21. The membrane of claim 20 wherein the sulfonyl-containing pendant groups are represented by the general formula:

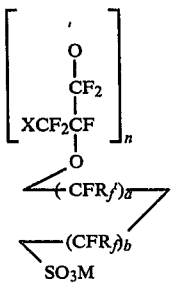

where
n=0 or an integer greater than zero;
X=F, Cl or Br;
M=hydrogen or an alkali metal;
$R_f$ and $R_f'$ are independently selected from the the group consisting of F, Cl, fluoroalkyl and chlorofluoroalkyl;
a=zero or an integer greater than zero;
b=zero or an integer greater than zero, provided $a+b \neq 0$.

22. The membrane of claims 20 or 21 where a'=0-3; b'=0-3; $R_f$=Cl or F; and $R_f'$=Cl or F.

23. The membrane of claims 20 or 21 where n=0-3 and X'=Cl or F when $n \neq 0$.

24. The membrane of claims 20 or 21 where n'=0.

25. The membrane of claims 20 or 21 where n=0 and X'''=F or Cl.

26. The membrane of claims 21 where n=0-3.

27. The membrane of claims 21 where a=0-3; b=0-3; $R_f$=Cl or F and $R_f'$=Cl or F.

28. The membrane of claim 21 where n=0; n'=0; and X'''=F or Cl.

29. The membrane of claim 21 where n'=1 and n=0.

30. The membrane of claim 21 where n'=0 and n=1.

31. The membrane of claim 21 where X=Cl and X'=Cl.

32. The membrane of claims 20 or 21 wherein at least 60 mole percent of the membrane is $CFXCF_2$.

33. The membrane of claims 20 or 21 wherein the membrane has an equivalent weight of at least 600.

34. The cell of claims 1 or 2 wherein the membrane has an equivalent weight of at least 600.

35. The cell of claims 1 or 2 wherein at least 60 mole percent of the membrane is $CFXCF_2$.

* * * * *

UNITED STATES PATENT AND TRADEMARK OFFICE
CERTIFICATE OF CORRECTION

PATENT NO. : 4,470,889

DATED : September 11, 1984

INVENTOR(S) : Bobby R. Ezzell; William P. Carl; William A. Mod

It is certified that error appears in the above—identified patent and that said Letters Patent is hereby corrected as shown below:

Col. 1, line 21; change "of" to --or--.

Col. 1, line 39; change "it" to --It--.

Col. 2, line 49; change "in", second occurrence, to -- is --.

Col. 3, line 1; change "sulfonamide" to --sulfonamides--.

Col. 4, line 40; change "more" to --mere--.

Col. 4, line 45; change "national" to --National--.

Col. 4, line 52; delete the word "unit".

Col. 5, line 1; change "lieftime" to --lifetime--.

Col. 8, line 41; change "member" to --membrane--.

Col. 8, line 50; change "hydrolyzed" to --Hydrolyzed--.

Col. 10, line 8; change "Comparisons" to --Comparison--.

UNITED STATES PATENT AND TRADEMARK OFFICE
CERTIFICATE OF CORRECTION

PATENT NO. : 4,470,889
DATED : September 11, 1984
INVENTOR(S) : Bobby R. Ezzell; William P. Carl; William A. Mod It is certified that error appears in the above—identified patent and that said Letters Patent is hereby corrected as shown below:

Col. 11, line 59; change "claims" to --claim--.

Col. 11, line 60; change "claims" to --claim--.

Col. 11, line 62; change "wherein" to --where--.

Col. 14, line 19; delete the second occurrence of "the".

Col. 14, line 31; change "claims" to --claim--.

Col. 14, line 32; change "claims" to --claim--.

Signed and Sealed this

Fourth Day of June 1985

[SEAL]

*Attest:*

DONALD J. QUIGG

*Attesting Officer*   *Acting Commissioner of Patents and Trademarks*